United States Patent

[11] 3,619,484

[72] Inventors Yutaka Tanaka
Chofu-shi;
Koichi Kobitsu, Tokyo, both of Japan

[21] Appl. No. 826,129
[22] Filed May 20, 1969
[45] Patented Nov. 9, 1971

[73] Assignees Matsushita Electric Industrial Co., Ltd.
Kadoma-shi, Osaka, Japan;
Matsushita Graphic Communication System, Inc.
Tokyo, Japan

[32] Priorities June 4, 1968
[33] Japan
[31] 43/38936;
May 24, 1968, Japan, No. 43/43738

[54] A COLOR FACSIMILE SCANNING SYSTEM

4 Claims, 7 Drawing Figs.

[52] U.S. Cl. .......... 178/5.2 R, 178/5.4 CF, 178/DIG. 2
[51] Int. Cl. .......... H04n 1/06
[50] Field of Search .......... 178/5.2, 5.4, 5.4 CF, 6, DIG. 2

[56] References Cited

UNITED STATES PATENTS

| | | | |
|---|---|---|---|
| 2,868,870 | 1/1959 | Goldmark | 178/6.8 |
| 2,921,118 | 1/1960 | Benjamin | 178/5.4 (RCF) |
| 3,036,153 | 5/1962 | Day | 178/6 (LCR) |
| 3,401,232 | 9/1968 | Goldhammer | 178/6 (LCR) |

*Primary Examiner*—Robert L. Griffin
*Assistant Examiner*—Richard P. Lange
*Attorney*—Stevens, Davis, Miller and Mosher

ABSTRACT: A color facsimile system wherein, in its receiving side, each of the color signals R, G and B (red, green and blue respectively) is received to vary the intensity of a light radiated from a light source depending on the intensity thereof, then, through a circular to linear scanning conversion device employing optical fibers, the above-mentioned light is scanned in a plane scanning system to be recorded on a recording material moving in the direction (an auxiliary scanning direction) perpendicular to the linearly arranged portion of the optical fibers thereby, performing color reproduction through reception scanning by partly overlapping scanning lines two thereof over the other, also having compatibility for receiving black-and-white signals, furthermore comprising a mechanism to hold the recording material at a constant position while the auxiliary scanning is being carried out.

INVENTORS
YUTAKA TANAKA
KOICHI KOBITSU
BY Stevens, Davis, Miller & Mosher
ATTORNEYS INVENTOR
YUTAKA TANAKA
KOICHI KOBITSU
BY Stevens, Davis, Miller & Mosher
ATTORNEYS

INVENTORS
YUTAKA TANAKA
KOICHI KOBITSU

BY Stevens, Davis, Miller & Mosher
ATTORNEYS

A COLOR FACSIMILE SCANNING SYSTEM

The present invention relates to a facsimile system, especially to a reception scanning system in its receiving side for each of the color signals R, G and B (red green and blue respectively) transmitted in line sequence from its transmitting side.

Further, the present invention relates to a facsimile system wherein compatibility for receiving also black-and-white signals is provided and furthermore a mechanism is provided to hold the recording material at a constant position while the plane scanning is effected by employing a circular to linear scanning conversion device utilizing optical fibers in the receiving side.

A first object of the present invention is to provide a reception scanning system wherein, in case that each of the color signals transmitted in line sequence from the transmitting side is received and scanned line by line in the receiving side, such a process that a given portion of the width of the scanning line width for a first R-signal is scanned so that it is overlapped by a portion of the width of the scanning line for a second G-signal and a given portion of the width of the scanning line width for a second G-signal is scanned so that it is overlapped by a portion of the width of the scanning line for a third B-signal, is repeated with the result that each one of the scanning lines for the color signals is scanned so that it is overlapped by the scanning lines corresponding to the other color signals.

A second object of the present invention is to provide a compatible color facsimile system through application of the above reception scanning system, whereby in the case of receiving black-and-white signals, can also be satisfactorily received, by merely speeding up the scanning speed in the auxiliary scanning direction so as to avoid overlapping the scanning lines each thereof by the others.

A third object of the present invention is, in a plane scanning system for obtaining a color reproduction by employing a circular to linear scanning conversion device utilizing optical fibers as its scanning device and by exposing the recording material moving in the direction (the auxiliary scanning direction) perpendicular to the linear arrangement of the optical fibers provided in the above-mentioned conversion device to the light radiated from a light source whose intensity is changed, depending on the intensity of each of the color signals, to provide a plane scanning apparatus having a mechanism to always hold the recording material on an optical focusing plane while auxiliary scanning is being carried out.

Other objects, features and advantages will be readily made apparent from the following description taken in conjunction with the accompanying drawings, in which:

FIGS. 1*a* and *b* are schematic explanatory drawings of the color facsimile system according to the present invention;

Figure 1A:
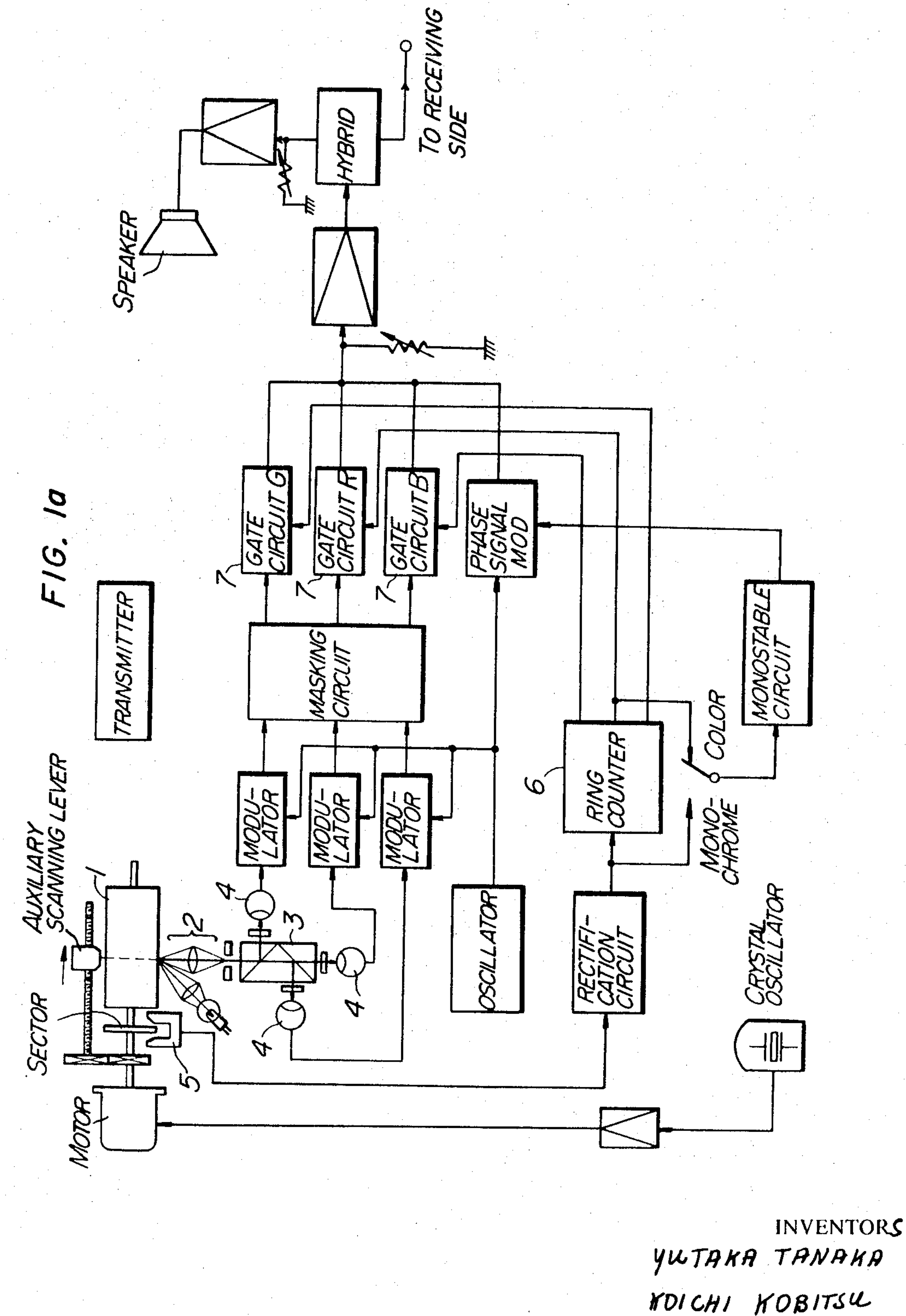
Figure 1B:
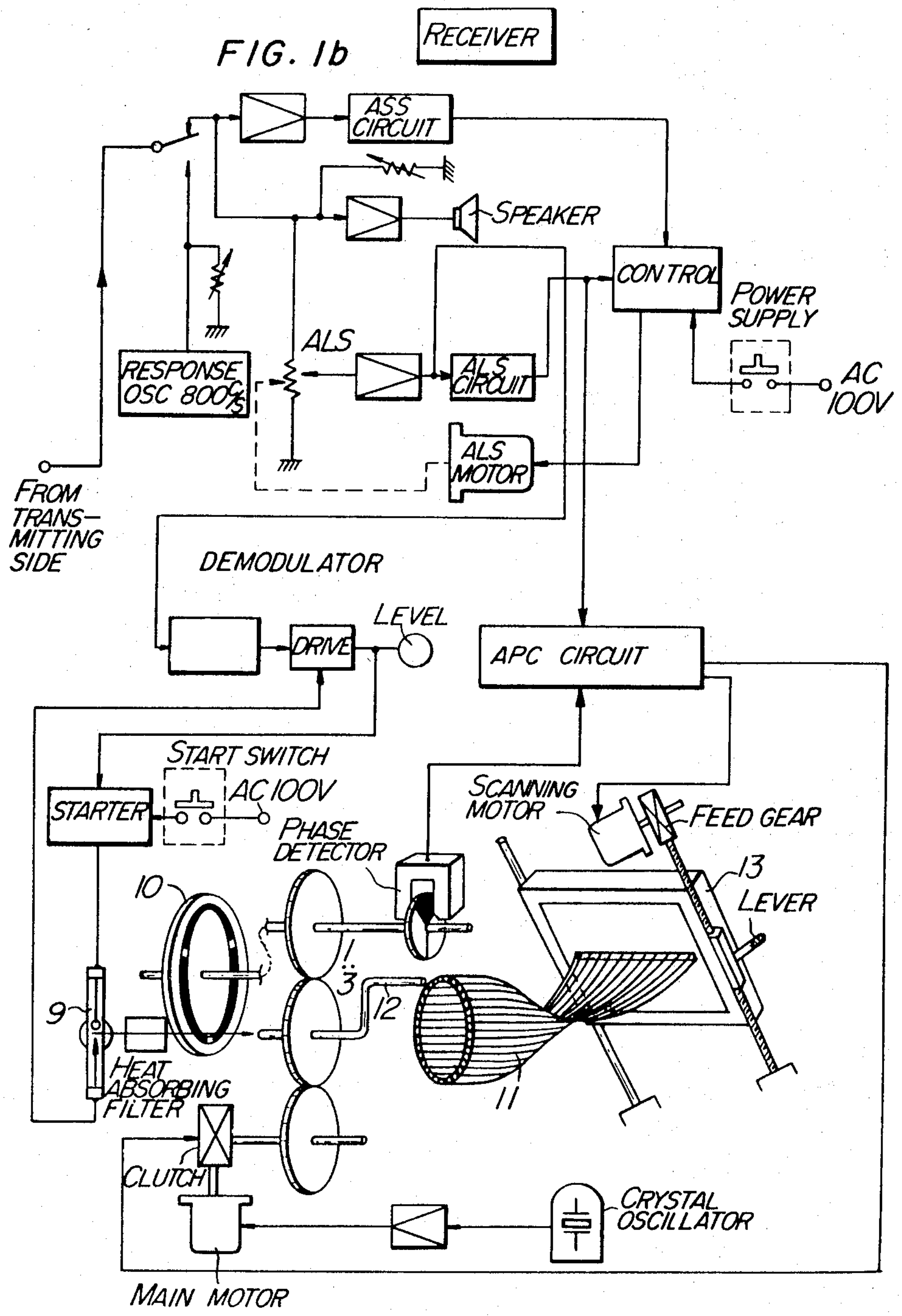

The outline of the color facsimile system according to the present invention will be explained in conjunction with FIGS. 1*a* and 1*b*. In the transmitting side shown in FIG. 1*a*, an original or a colored original to be reproduced is wound round a drum 1, main scanning is performed by rotating the drum 1, and auxiliary scanning is performed by shifting an optical system composed of a lens system 2, a dichroic prism 3 for color separation, photomultipliers (more generally, photocells) 4, etc. in the direction of the axis of rotation of the drum 1. Further, a phase detector 5 which produces one pulse per revolution of the drum 1 being directly related with the rotation of the drum 1 is added, and one phase pulse produced per one main scanning line, namely three total phase pulses produced per three main scanning lines are divided by three through a ternary ring counter 6, each of the resultant signals serving as a gate signal for a gate circuit 7 described hereinafter.

A colored original is scanned and separated into a number of picture elements, further the light corresponding to each picture element is separated into three primary colors in the order of G (green), B (blue) and R (red) through a rectangular parallelepiped shaped dichroic prism 3, and each of the separated colors is converted into an electric signal proportional to the light intensity corresponding to each picture element through the photomultiplier 4. Hence, the output of the photomultiplier is proportional to the intensity of a light reflected from the original. In the next stage, each of the color signals R, G and B which are the outputs of the photomultipliers, modulates a carrier wave in a modulator, which is led to a masking circuit. In the masking circuit, color correction corresponding to the density of the original is performed, and each of the color signals R, G and B is led to the gate circuit 7. As described above, there is employed a line-sequential transmission system wherein each of the color signals R, G and B is transmitted being sequentially switched at every line of main scanning through the gate circuit 7 by the respective corresponding gate signals.

The above description has been directed to the outline of the transmitting side. Next, in the receiving side shown in FIG. 1*b*, an ASS (Automatic Start Stop) circuit alone is always in its operative state. First, the ASS circuit, which is tuned to the carrier wave (including a phase signal) transmitted from the transmitting side, is started by the reception of the carrier wave causing main power source switch to be closed and a main motor to start its rotation. Both main motors in the transmitting and receiving sides are driven by means of crystal oscillators having the same frequency, thus employing an independent synchronization system. Next, an ALS (Automatic Level Set) circuit is started When a reference input level is reached by turning a potentiometer with an ALS motor, the ALS motor stops its rotation thus completing the level setting. Here, the speakers illustrated in FIGS. 1*a* and 1*b* act as devices for monitoring color signals, etc. are transmitted and received, respectively. Further, in 1*b*, a color filter 10 having three primary colors R (red), G (green) and B (blue) is rotated in front of a light source 9 (a glow lamp, a xenon lamp, etc.) radiating a light whose intensity is changed depending on the intensity of each of the color signals R, G and B transmitted in line sequence, being synchronized with the phase signal transmitted from the transmitting side. At the time when the R-signal has been transmitted, the light radiated from the light source 9 is colored in red by the corresponding red filter in the rotary color filter 10, and one line is scanned in the reception scanning. In this case, a given constant portion of the width of the scanning line for each of the color signals is regularly overlapped by a portion of the width of the scanning line for the following color signal, and there is provided a feature that, as a result, each one scanning line corresponding to one color signal is scanned being overlapped by the scanning lines corresponding to the other color signals. Accordingly, in the case of providing the color signal receiver with compatibility for also receiving black-and-white signals, there is provided a feature that, only through mechanically speeding up the auxiliary scanning speed in the receiving side at least to the extent of the degree of overlapping within each scanning line width for color signal reception thereby preventing each scanning line from being overlapped by the other scanning lines, black-and-white signals can be received in one third of the time required for receiving color signals.

A circular to linear scanning conversion device utilizing the optical fibers 11 is employed in the receiving side, in which device, by means of a crank-shaped rotary scanner 12 having its axis of rotation at the center of the circularly arranged portion of the optical fibers 11 in the conversion device, each of the colored light beams R, G and B coming from the light source 9 which is positioned on the axis of rotation is distributed in order into the circularly arranged portion of the optical fibers 11 in the circular to linear scanning conversion device and led to the linearly arranged portion through the optical fibers. Further, a plane scanning system is employed wherein a recording material such as color film, color sensitive paper, etc. which moves in the direction (the auxiliary scanning direction) perpendicular to the linearly arranged portion of the optical fibers 11 is exposed to the above-mentioned colored light beams to produce a color reproduction. Especially in the receiving apparatus of the embodiment according to the present invention, color sensitive paper enclosed within a camera back 13 mounted on a movable base which moves in the direction (the auxiliary scanning direction) perpendicular to the linearly arranged portion of the optical fibers 11 is exposed to each of the colored light beam R, G and B to produce a color reproduction. In this case, there is provided a feature having a construction wherein the top surface of the linear scanning portion of the optical fibers 11 is positioned at such a height as always pressing a supported plane of the recording material in the camera back 13 slightly upward so that the recording material in the camera back 13 may always be held at a constant position, namely at the optical focusing position while the auxiliary scanning is carried out.

One of the objects of the present invention is that the scanning line for each of the separated color signals transmitted in line sequence from the transmitting side scanned so that is is overlapped by the succeeding scanning lines for the other separated color signals in the receiving side.

Figure 2:
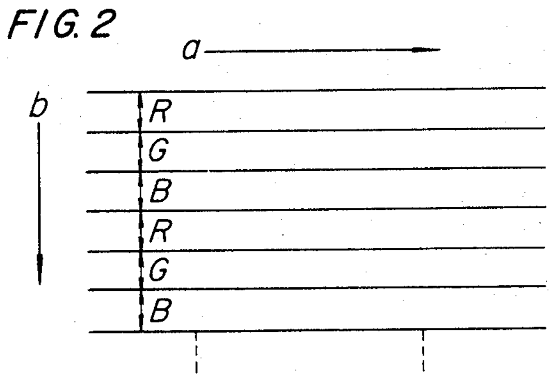
FIG. 2 shows an example according to conventional practice in the case of reception scanning for the color signals transmitted in line sequence from the transmitting side.

Conventionally, separated color signals transmitted in line sequence from the transmitting side have been scanned in sequence, scanning lines thereof having widths equal to one another, not overlapping one another, besides leaving no gaps therebetween. With reference to FIG. 2, the arrow *a* indicates the direction of main scanning and the arrow *b* that of auxiliary scanning. As shown in the drawing, each of the color signals R, G and B transmitted in line sequence from the transmitting side has been scanned line by line in order of R, G and B, scanning lines thereof having widths equal to one another and further not overlapping one another. In this case, if scanning lines should overlap one another even to a small degree, only that part becomes conspicuous thereby causing partial color shading, On the contrary, if a gap should arise between scanning lines, only that part becomes black because there is no incident light thereupon, thereby causing deterioration in color purity. Hence, high precision has been required for the mechanical construction of the scanning apparatus.

Furthermore, when black-and-white signals are needed to be received with a color signal receiver, the reception cannot be performed only by changing the auxiliary scanning speed as it is made possible with the color facsimile system according to the present invention. Therefore, it has been necessary to receive by spending as much time as required for receiving color signals, or, for the purpose of taking advantage of a shortened time for receiving black-and-white signals, to provide another scanning apparatus for exclusive use in receiving of black-and-white signals.

Figure 3:
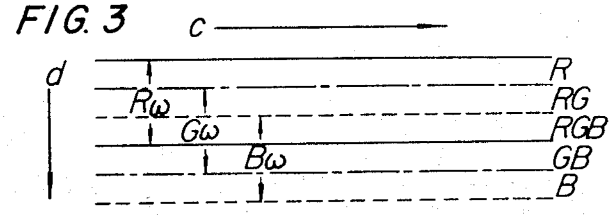
FIG. 3 is an explanatory drawing wherein the scanning lines for the color signals transmitted in line sequence from the transmitting side are scanned overlapped two thereof over the other in the receiving side.
Figure 4:
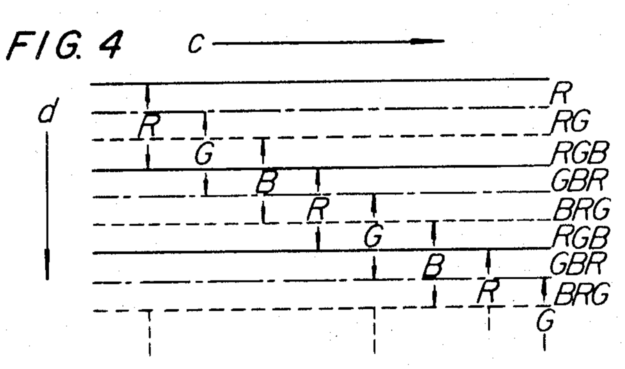
FIG. 4 is a general explanatory drawing of the scanning lines for the overlapped scanning shown in FIG. 3.

The scanning system in the receiving side of the color facsimile system according to the present invention is shown in FIG. 3 as compared with the above conventional practice. In FIG. 3, the arrow *c*, indicates the direction of main scanning and the arrow *d* that of auxiliary scanning. Suppose now that the color signals are transmitted in the order of R, G and B and the widths of scanning lines for the color signals R, G and B are respectively designated Rw, Gw and Bw being equal to one another namely having the relation Rw = Gw = Bw. First, one scanning line for R-signal having the width Rw is scanned on the recording material. Next, another scanning line for a second G-signal having the width Gw is scanned, however, in this case, Gw is scanned overlapping two thirds of Rw. Another scanning line for a third B-signal having the width Bw is scanned overlapping one third of Rw, consequently overlapping two thirds of Gw. As the above-mentioned overlapped scanning is successively repeated in the order of the color signals R, G and B, in a color reproduction obtained in the receiving side as shown in FIG. 4, it follows that any one of the scanning lines for the color signals R, G and B is scanned so that it is overlapped by others except at the beginning and end of scanning. Accordingly, the above conventional troubles of partial color shading and deterioration in color purity due to occurrence of a gap between scanning lines are completely prevented. Some allowance is also obtained in the mechanical construction thereof. In the above embodiment, the times of overlapping in each scanning line is assumed to be three, however, it is not necessarily confined to three, and it should be appreciated that no portion is to be found in scanning lines wherein there is no incident light, irrespective of the overlapping times, three, four and so on, of the scanning lines.

Furthermore, in case that a color signal receiver is to be provided with compatibility for receiving also black-and-white signals by means of the above overlapped scanning system, one third of the time necessary to receive color signals is sufficient to receive black-and-white signals through trebling the auxiliary scanning speed (in the case that each scanning line is scanned so that it is being overlapped three times by the others).

Next, a description will be given of the reception scanning apparatus. In the reception scanning, the recording material which moves in the direction (the auxiliary scanning direction) perpendicular to the linear scanning portion of the circular to linear scanning conversion device utilizing optical fibers is exposed to the light radiated from a light source whose intensity is changed depending on the intensity of each of the color signals thereby effecting recording thereon. In this case, the recording material has always to be held at a constant position (the optical focusing position) while the auxiliary scanning is being carried out, so that a color reproduction having good resolution may be obtained. For that purpose, a device described hereunder is employed.

Figure 5:
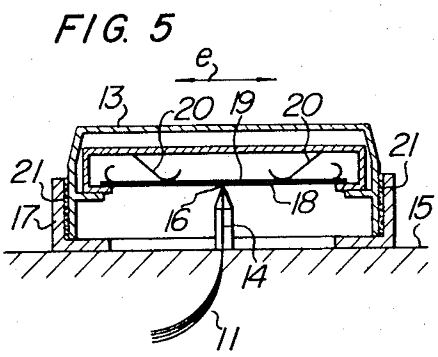
FIG. 5 is a drawing of longitudinal section of the scanning apparatus in the receiving side.

With reference to FIG. 5, there is shown a longitudinal section of the reception scanning apparatus comprising the linearly arranged portion 14 of the circular to linear scanning conversion device utilizing optical fibers which portion 14 is fixed in a bed 15 and projected from the upper surface of the bed 15 perpendicularly thereto. This portion is wrought and strengthened to form a linear scanning portion 16. The other end of the optical fibers 11 is led to the circularly arranged portion. Numeral 17 designates a movable base which moves on the upper surface of the bed 15 in the direction (shown by the arrow *e* ) perpendicular to the linear scanning portion 16 so as to effect auxiliary scanning. A driving mechanism of the movable base 17 is not shown in the drawings. Numeral 13 designates a camera back enclosing a recording material 18 and mounted on the movable base 17 so as to be easily attached thereto or removed therefrom. Numeral 19 designates a holding plate which holds down all over the surface of the recording material 18 reverse to the sensitive surface thereof by means of the elastic force of a holding spring 20.

Numeral 21 designates felt sheets which are attached onto the inside surface of the movable base 17 serving both as shade and as buffer.

The recording material 18 such as color film, color sensitive paper, etc. is enclosed within the camera back 13 and, as mentioned above is adapted to be held down by the action of the elastic force of the holding spring 20 through the holding plate 19 on the entire surface reverse to the sensitive surface thereof.

Before recording is started, the recording material 18 is fixed into the camera back 13, then the camera back 13 is turned over just as it is, and mounted on the movable base 17 which is somewhat larger than the camera back 13 in plane size and has the felt sheets 21 attached onto the inside surface thereof, being shaded by said felt sheets. During the auxiliary scanning process, the recording material 18 has always to be held at a constant position (the optical focusing position) with respect to the linear scanning portion 16 of the optical fibers. The reason is that, if a gap arises at the contact portion between the linear scanning portion 16 of the optical fibers and the recording material 18 while the auxiliary scanning is being carried out, the received picture will be immediately out of focus.

Figure 6:
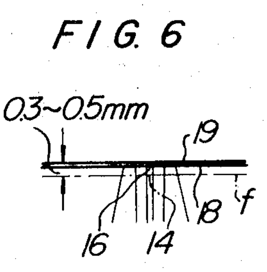
FIG. 6 is an enlarged drawing of an essential portion of the scanning apparatus shown in FIG. 5.

FIG. 6 is an enlarged drawing of the contact portion between the linear scanning portion 16 of the optical fibers and the recording material 18. As shown in the drawing, the linear scanning portion 16 of the optical fibers which is fixed to the bed 15 and projected from the upper surface of the bed 15 perpendicularly thereto is constructed to extend by about 0.3 to 0.5 mm. higher than the level (the position shown in FIG. 6 with an alternate long and short dash line *f*) where the recording material 18 is supported by the holding plate 19 on the entire surface reverse to the sensitive surface thereof. Considering, for instance, dispersion in production and damage on the sensitive surface of the recording material due to scanning thereon, the above-mentioned value of about 0.3 to 0.5 mm. is the most suitable one for obtaining a received picture having sufficient resolution.

For the camera back described in the above embodiment of the invention, a Polaroid Camera (Registered Trade Mark) is employed. Accordingly, Polaroid color sensitive paper is employed as the recording material to be recorded thereon, and a color picture is obtained automatically in a given time after its exposure. In this case, it is possible to reduce a large portion of time, equipment etc. necessary for developing as compared with the case of employing ordinary color film and color sensitive paper. Because of the above advantages of the color sensitive paper. Because of the above advantages of the color facsimile system according to the present invention, it is most suitable for the transmission of news photos which should be reported rapidly as in a broadcasting station, a newspaper office, etc.

As described hereinbefore, in the color facsimile system according to the present invention, when the color signals R, G and B transmitted in line sequence from the transmitting side are scanned line by line in the receiving side, each scanning line is scanned so that it is overlapped by the others, therefore such troubles as occurrence of color shading and deterioration in color purity due to a gap between scanning lines do not arise. Further, when a color signal receiver is needed to have compatibility for receiving also black-and-white signals, only a change in the auxiliary scanning speed through a mechanical step for preventing overlapping among scanning lines in sufficient to receive black-and-white signals satisfactorily in a short time.

While, in the reception scanning apparatus, a plane scanning system is employed wherein, through the introduction of a circular to linear scanning conversion device utilizing optical fibers, a light radiated from a light source depending on the intensity of the signals transmitted in line sequence is transmitted through a color filter, distributed to the circularly arranged portion of the optical fibers by a crank-shaped rotary scanner, then led to the linearly arranged portion of the optical fibers and recording material which moves in the direction (the auxiliary scanning direction) perpendicular to the linearly arranged portion of the optical fibers is exposed to the above-mentioned scanning light to produce a color reproduction. Further, in order to maintain the recording material at the optical focusing position while the auxiliary scanning is being carried out, the relative positions of the recording material and the linear scanning portion of the optical fibers are arranged so that the above linear scanning portion of the optical fibers may always be pressing the recording material slightly upward, thereby always maintaining the recording material at a constant position (the optical focusing position) and consequently making it possible to obtain a received picture (a color reproduction) having good resolution.

We claim: 1. A color facsimile system wherein, in its receiving side, a color filter corresponding to the transmitted signal is rotated in synchronism with the main scanning of the transmitting side in front of a light source radiating a light whose intensity depends upon that of each of the color signals transmitted in line sequence from the transmitting side, thus when an A-signal is transmitted, for example, an A-colored filter within said rotary color filter faces and said light beam to color it in A-color, said colored light is led through a circular to linear scanning conversion device made of glass fibers to a linear scanning portion thereof, and the recording material which moves in the direction (an auxiliary scanning direction) perpendicular to said linear scanning portion is exposed to said colored light thereby reproducing an original color component, characterized in that, when each of the color signals transmitted in line sequence is received and scanned line by line, such a process, that a given portion of the width of the scanning line for a first color signal is scanned so that is is overlapped by a portion of the width of the scanning line for a second color signal and a given portion of the width of the scanning line for a second color signal is scanned so that it is overlapped by a portion of the width of the scanning line for a third color signal, is repeated with the result that each one the scanning lines for the color signals is scanned so that it is overlapped by the scanning lines corresponding to the other color signals.

2. A color facsimile system according to claim 1 characterized in that a color signal receiver can also receive black-and-white signals through a mechanical step only to speed up the auxiliary scanning speed until the overlapping within the width of each scanning line is eliminated.

3. A color facsimile system according to claim 1 wherein a color filter having three colors R (red), G (green) and B (blue) is rotated in synchronism with the main scanning of the transmitting side in front of a light source which radiates a light depending on the intensity of each of the color signals R, G and B transmitted in line sequence from the transmitting side, when R-signal is transmitted, a red filter within said rotary color filter faces said light radiated from said light source to color it in red, said colored light is led through a crank-shaped rotary scanner successively to a circularly arranged portion and then said linearly arranged portion of said optical fibers in said circular to linear scanning conversion device, and said recording material which moves in the direction (the auxiliary scanning direction) perpendicular to said linear scanning portion is exposed to said colored light thereby producing a color reproduction, characterized in that, when each of the color signals transmitted in line sequence is received and scanned line by line, such a process, that a given portion of the width of the scanning line for a first color signal is scanned so that is is overlapped by a portion of the width of the scanning line for a second color signal and a given portion of the width of the scanning line for a second color signal is scanned so that it is overlapped by a portion of the width of the scanning line width for a third color signal, is repeated with the result that each one of the scanning for the color signals is scanned so that it is overlapped by the scanning lines corresponding to the other color signal.

4. A color facsimile system according to claim 3 characterized in that the top surface of said linearly arranged portion of said optical fibers is positioned so as to always press the surface of said recording material slightly upward.

* * * * *